(12) United States Patent
Karem

(10) Patent No.: US 8,114,329 B2
(45) Date of Patent: Feb. 14, 2012

(54) WING AND BLADE STRUCTURE USING PULTRUDED COMPOSITES

(76) Inventor: Abe Karem, N. Tustin, CA (US)

(*) Notice: Subject to any disclaimer, the term of this patent is extended or adjusted under 35 U.S.C. 154(b) by 163 days.

(21) Appl. No.: 12/397,141

(22) Filed: Mar. 3, 2009

(65) Prior Publication Data

US 2009/0220747 A1    Sep. 3, 2009

Related U.S. Application Data

(60) Provisional application No. 61/033,337, filed on Mar. 3, 2008.

(51) Int. Cl.
*B29C 70/52* (2006.01)
*B32B 38/10* (2006.01)

(52) U.S. Cl. ............... 264/258; 264/162; 264/172.2; 264/209.3; 156/154; 156/177; 451/28

(58) Field of Classification Search ............... 451/28, 451/61; 264/138, 162, 177.1, 172.2, 209.3, 264/258; 51/297; 156/153, 154, 177, 181, 156/250, 257

See application file for complete search history.

(56) References Cited

U.S. PATENT DOCUMENTS

| | | | |
|---|---|---|---|
| 3,885,071 A * | 5/1975 | Blad et al. ........... | 428/60 |
| 4,750,905 A | 6/1988 | Koeneman et al. | |
| 5,318,422 A | 6/1994 | Erland | |
| 5,362,545 A * | 11/1994 | Tingley ............... | 428/96 |
| 5,462,618 A | 10/1995 | Rogers et al. | |
| 5,478,426 A | 12/1995 | Wiler et al. | |
| 5,499,904 A | 3/1996 | Wallace et al. | |
| 6,145,791 A * | 11/2000 | Diller et al. ........ | 244/215 |
| 7,198,471 B2 * | 4/2007 | Gunneskov et al. ... | 416/229 R |

* cited by examiner

*Primary Examiner* — Donald J Loney
(74) *Attorney, Agent, or Firm* — Fish & Associates, PC

(57) ABSTRACT

Tapered layers of pre-cured composite material are integrated into a tapered, highly stressed laminate structure in order to provide improved compressive strength. The pre-cured composite material can advantageously be cured under tension as pultruded material, to further augment compressive strength. The thickness of composite layers can be tapered on their termination edges by mechanically abrading, chemical abrading, or other methods. Especially preferred embodiments include aircraft structural components such as wings, wing spars, wing skins, fuselage skins, rotor blades, propellers, and propeller blades. Preferred laminates can be constructed to have at least 6, 10, 30, 50, or 100 layers of material, and can have a maximum thickness of at least 0.15, 0.25, 0.5, 1.0, or 5.0 inches.

14 Claims, 6 Drawing Sheets

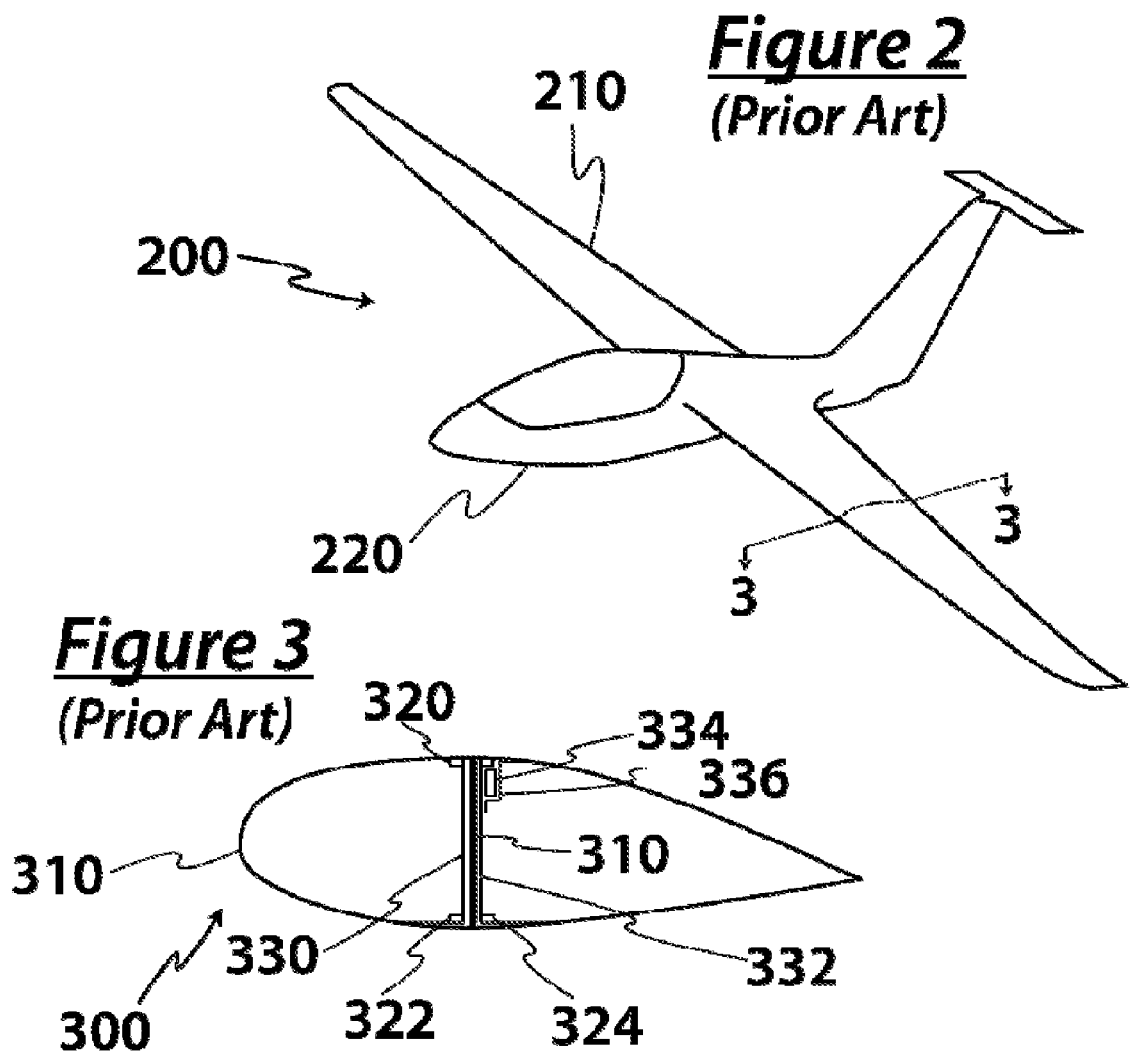

WING AND BLADE STRUCTURE USING PULTRUDED COMPOSITES

This application claims priority to U.S. provisional application Ser. No. 61/033,337, filed Mar. 3, 2008, the disclosure of which is incorporated herein in its entirety.

FIELD OF THE INVENTION

The field of the invention is composite structures.

BACKGROUND

Due to the nature of flight, desirable aircraft structures have traditionally had high strength-to-weight ratios (strength efficiency) and stiffness-to-weight ratios (stiffness efficiency). In the last several decades, carbon composite materials were often used in aircraft structures to improve strength and stiffness efficiency in the airframe. Although carbon composite materials do provide weight savings over traditional aluminum structures, carbon composite materials still suffer from a comparatively low compression strength. In a typical unidirectional carbon composite laminate the compression strength is approximately 50% of the tension strength of the material. This is caused by small amplitude waviness in the unidirectional fibers. These small eccentricities in the fibers promote micro buckling of the laminate under compressive loads.

Aircraft wing and blade structures in particular see high bending stresses due to the cantilevered configuration of their structure, and the thin sections required for aerodynamic performance. The bending creates high compression loads in the upper surface of a cantilevered wing or blade structure. Thus, although composite materials do increase the structural efficiency (ratios of strength to weight or stiffness to weight) of aircraft structures over a typical aluminum structure, there is still a large performance gap that can be bridged by increasing the compression strength of the composite laminate.

It is known in the composite materials industry that pultruded composites exhibit significantly higher compression strength than typical fibers pre-impregnated with resin (pre-preg in the industry vernacular) in autoclave cured laminates. The pultrusion process of tensioning fibers and curing them under tension raises the compression strength of the material by over 60%. Pultruded composites also allow lower resin content and therefore a higher fiber volume fraction than a comparable pre-preg structure. Higher fiber volume fractions also lead to higher composite material stiffnesses and strength per unit weight.

FIG. 1 depicts a typical prior art process for making pultrusions. This figure is adapted from "Composite Airframe Structures: Practical Design Information and Data", by Michael C. Y. Niu, Hong Kong Conmilit Press Ltd., 2005. One or more spools or other sources 102, 104, 106 of tape or other composite material comprising fibers unreel material into one or more wet-out stations or resin tanks 110, 120. The material is then pulled in tension by a pull station 130 before being cured into shape at a heated die station 140 powered by a power source 142. Finished material 150 leaves the die 140 with largely constant cross-section. The finished material 150 comprises pre-cured, pultruded composite fibers. A pre-cured composite material is pultruded when it is cured or formed under tension.

The Niu book, as well as all other extrinsic materials discussed herein, is incorporated by reference in their entirety. Where a definition or use of a term in an incorporated reference is inconsistent or contrary to the definition of that term provided herein, the definition of that term provided herein applies and the definition of that term in the reference does not apply.

The value of pultrusions is recognized in the industry; they are employed in composite structures, such as high compression strength areas like wings. FIG. 2 is an illustration of the prior art Genesis 2 sailplane made by Group Genesis™. The aircraft 200 comprises a wing 210 and a fuselage 220. FIG. 3 is a section view of the wing 210. The prior art wing section 300 comprises an airfoil 310 defining the outer boundary. Disposed within the airfoil are a foam vertical stiffener 310 providing bending stiffness, a number of fiberglass laminate sheets 330, 332, 334, 336, and several pultruded rectangular carbon rods 320, 322, 324 that run the length of the wing. Pultrusions have also been used in the wing structures made by large military airframers. However, in prior art known to the inventor, these pultrusions have always been used either as continuous strips running the length of the beam, or as very small rods in an under-stressed structure.

Typical distributed loads on a cantilevered structure such as a wing result in a moment that drops off rapidly from the root to the tip of the structure. A tapered beam structure is often used to take full advantage of possible weight savings where extra structure is not needed. Currently, any tapering of a pultruded structure simply drops off small pultruded sections and uses the material in an under-stressed design, otherwise the abrupt changes in a load bearing members cross-section are transferred to the nearby supporting matrix in too small an area. The resulting stress riser fails the nearby supporting matrix material and ultimately cause a failure of the laminate. Therefore, there is still a need to employ high compression strength composite pultrusions in a highly stressed, tapered laminate.

SUMMARY OF THE INVENTION

The present invention provides systems, apparatus, and methods in which tapered layers of pre-cured composite material are integrated into a tapered, highly stressed laminate structure in order to provide improved compressive strength. It is contemplated that the pre-cured composite material could advantageously be cured under tension as pultruded material, to further augment compressive strength. The thickness of composite layers could be tapered on their termination edges by mechanically abrading, chemical abrading, or other methods.

It is contemplated that the pre-cured composite material could be pultruded such that a layer in the laminate structure has a thickness of at least $10/1000$, $15/1000$, or $20/1000$ inch. The pre-cured composite material could advantageously include graphite, fiberglass, aramid, or boron fibers.

Especially preferred embodiments include aircraft structural components such as wings, wing spars, wing skins, fuselage skins, rotor blades, propellers, and propeller blades. These components are often highly stressed structures and can benefit from increased compressive strength.

Preferred laminates can be constructed to have at least 6, 10, 30, 50, or 100 layers of material, and can have a maximum thickness of at least 0.15, 0.25, 0.5, 1.0, or 5.0 inches. It is contemplated that one layer in a preferred laminate could have fibers predominantly aligned in one direction, while another layer could have fibers predominantly aligned in another direction. This heterogeneous fiber layout allows for tailoring of the strength of a composite structure. In some embodiments, such as angled or kinked joints, layers in a laminate might have long axes in different directions, at least 10°, 30°, 60°, 90°, or 120° apart.

Viewed from another aspect, the present inventive subject matter can provide for increased compressive strength in a composite laminate by including a layer with pultruded fibers which vary in thickness by at least 10%, 30%, or 60% along its length, and tapering the thickness of the composite laminate by at least 40%, 60%, or 80% from a maximum thickness. In more preferred embodiments, additional layers with pultruded fibers or other pultruded material could be included in the laminate. In especially preferred embodiments, the fibers are graphite fibers, and the composite layers have a thickness of $10/1000$, $15/1000$, $20/1000$, or $25/1000$ inch.

It is contemplated that laminates can have one or more layers which advantageously taper at a 10:1, 20:1, 40:1, or shallower slope. Further, preferred laminates can comprise additional layers of biased pre-preg tape to provide shear strength and shear stiffness.

BRIEF DESCRIPTION OF THE DRAWING

FIG. 2 is an illustration of the prior art Genesis 2 sailplane.

FIG. 3 is a section view of a prior art aircraft wing.

DETAILED DESCRIPTION OF THE INVENTION

Figure 1:
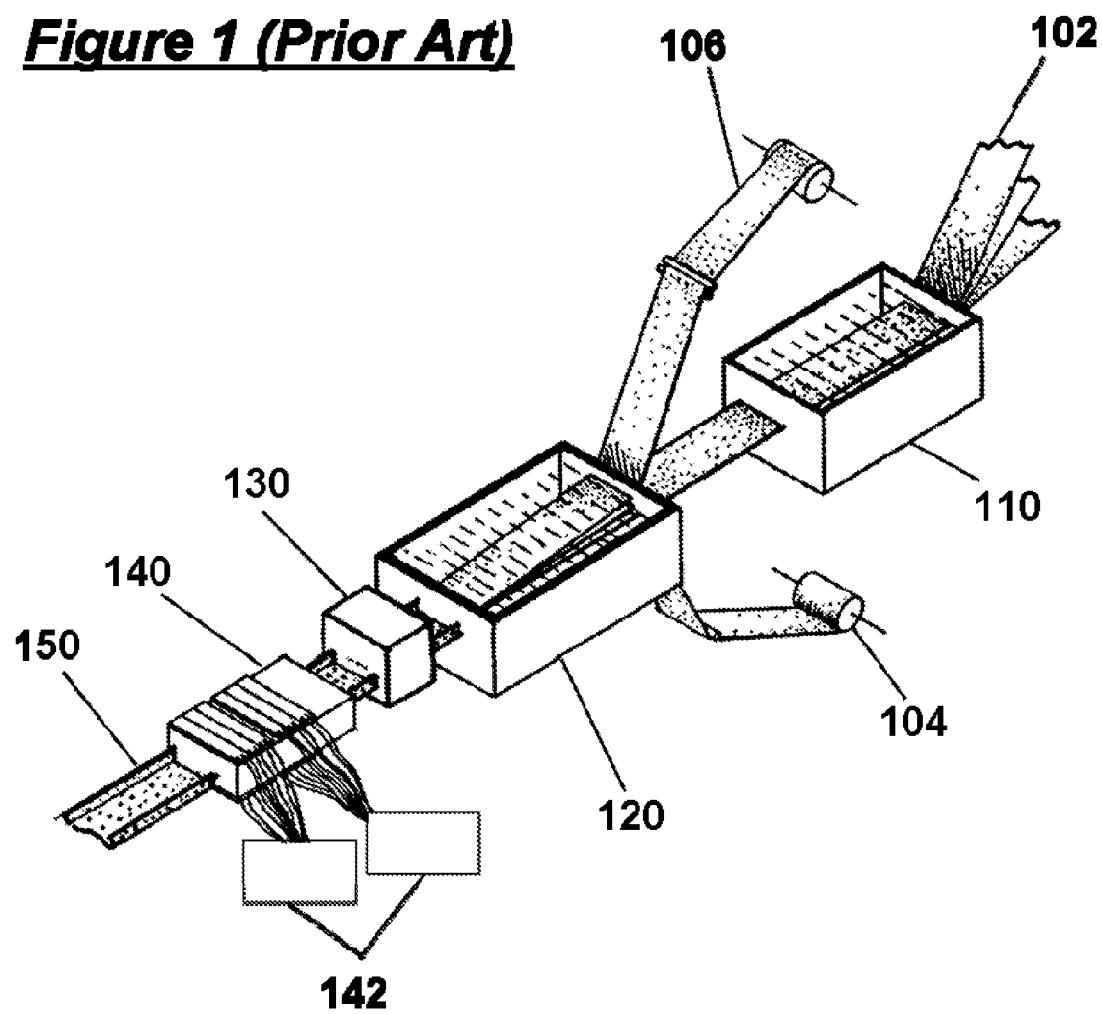
FIG. 1 depicts a typical prior art process for making pultrusions.

As shown in the drawing figures discussed below, pultruded fibers can be integrated into a highly-stressed tapered beam structure such as a structurally efficient aircraft wing, rotor blade, or propeller. Pre-cured pultruded material is advantageously laminated into a composite aircraft spar structure adding high compressive strength material to areas where it is most effective, thereby reducing aircraft weight and increasing structural capacity.

As used herein, "composite" means engineered materials comprising two or more constituent materials. Of special relevance is carbon composites, in which carbon fiber is embedded in a matrix or resin. Alternate composites are also contemplated, including those containing fiberglass, ceramics, and other elements. A layer of composite material could include a plurality of fibers positioned at an orientation with respect to the long axis of an object. A layer of composite material could also advantageously include pultruded fibers in the form of a pultrusion. All suitable fibers including graphite, fiberglass, aramid, and boron are contemplated, as well as all suitable matrix or resin materials. Similarly, all commercially viable pultrusion shapes and thicknesses are contemplated.

Figure 4:
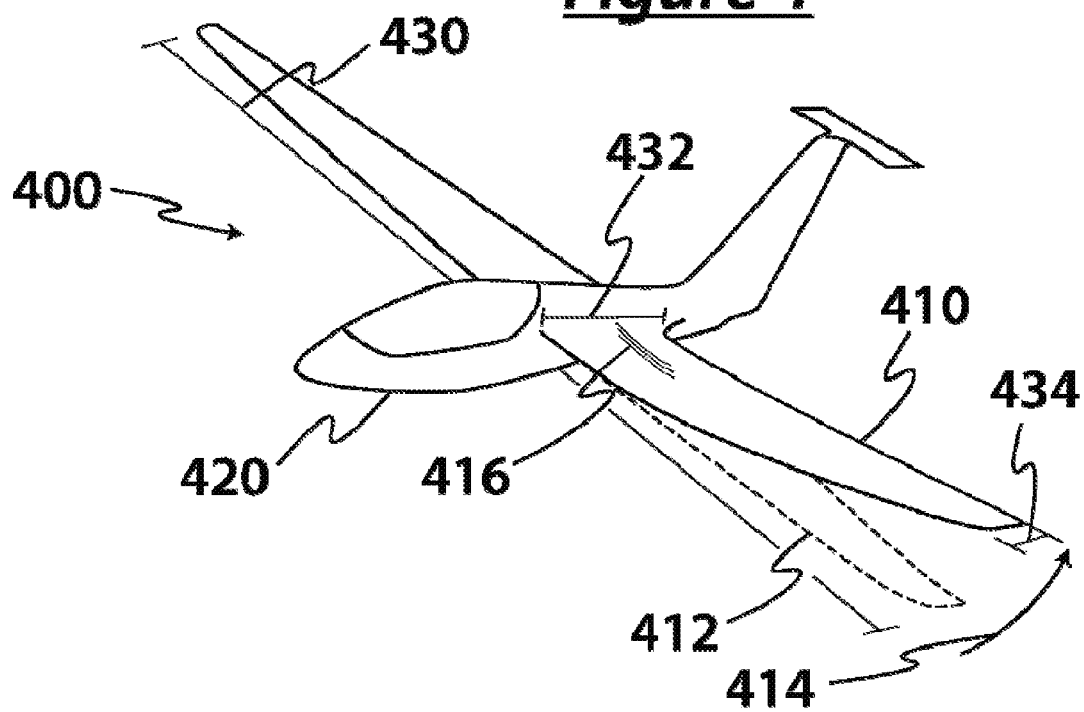
FIG. 4 depicts a preferred improved aircraft having improved wing structure.

FIG. 4 depicts a preferred improved aircraft comprising a fuselage 420 and a wing 410 having a total span 430. The wing 410 (in solid lines) is shown in a position deflected from the undeformed wing position 412 (in dashed lines). This deflection in the direction of arrow 414 is in response to the distributed aerodynamic and inertial loading arising from flight. Further, the wing is a tapered structure, having a root chord 432 and a tip chord 434. As used herein, a "tapered structure" means structures which have a tip chord 434 or narrow end that is 80% or less of the width of the root chord 432 or wide end. The term "slender" is used to mean structures for which the total span 430 or length is at least four times the average chord or width.

A preferred composite wing 410 has representative fibers 416 in the upper structural member (compression cap) of the wing 410. Representative fibers 416 should be interpreted to include at least one of graphite, fiberglass, aramid, and boron. Strain is a non-dimensional measure of structural extension, expressed as the change in length divided by original length. Because strain values tend to be small, the term "microstrain" is often used as a unit, meaning 1million (10 to the 6th power) units of strain. A structure is said to be highly strained when its maximum calculated ultimate strain is 1000 microstrain or more. For an aircraft, the maximum calculated ultimate strain in a structure such as a wing or blade usually arises with a loading from the aircraft at maximum weight multiplied by three (for an acceleration three times gravitational acceleration) further multiplied by 1.5 (as a factor of safety).

Figure 5:
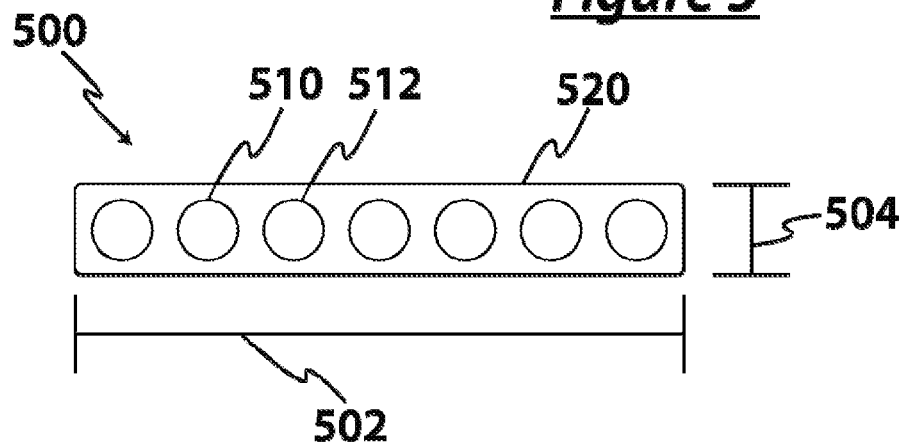
FIG. 5 is a cross-section of a preferred thin pultrusion strip.

In preferred embodiments, pultruded fibers in broad thin pultrusion strips are incorporated into aircraft structure. A cross-section of a preferred pultrusion strip 500 is shown in FIG. 5. A plurality of fibers 510, 512 are embedded in a matrix or resin 520. The pultrusion strip is pre-cured through any suitable process. A thin pultrusion strip 500 is one for which the width dimension 520 is at least six times the thickness dimension 504, the ratio of these is referred to herein as the "degree of thinness." All suitable degrees of thinness are contemplated, including at least 6, 10, 20, 30, 50, and even 100. A broader strip allows for increased laminating productivity. Using a thin strip reduces the step in cross-section when a pultrusion is dropped off. The minimum thickness 504 of the strip is limited by the current manufacturing capabilities of the pultruding machine (currently about 0.02 inches), but is still three to four times thicker than a typical pre-preg tape. The strip can also be made up to 10 times the thickness of a pre-preg tape layer for increased laminate manufacturing efficiency. Thus, embodiments are contemplated which comprise a layer of pultruded pre-cured composite material having a thickness of at least $10/1000$, $20/1000$, $50/1000$, or even $100/1000$ of an inch.

It is contemplated herein that pultrusions could be advantageously kitted in a manner similar to some pre-preg tape, comprising cutting the pultrusions to appropriate lengths and cutting for the intended structural planform. It is further contemplated that pultrusions may also be placed in the laminate with the help of laser placement machines. As used herein, "biased pre-preg tape" refers to a tape made of resin pre-impregnated composite fibers woven together. Individual fibers in such a weave might have angles biased relative to an axis, an exemplary angled bias being fibers of +45° and −45°.

As used herein, a "laminated object" refers to an object made with laminates, such as a laminated composite structure. These laminates typically comprise multiple layers or plies of composite with fibers in a resin. Individual layers or plies preferably have a plurality or fibers arranged in a predominantly similar orientation. Different layers in a laminate can have fibers at different angles. However, in some cases, a laminate may comprise only a single layer of material. An "object having a cavity" refers to either an object with boundaries defining an internal void, including tubes, or open sections including channels. A single-cell or multi-cell wing or blade is an example of an object having a cavity. A layer in the laminate has a "termination edge" if the layer does not extend to the outer boundaries of the laminate. Laminate layers are typically independent before curing and generally flat before being formed into the desired shape, thus usually not interwoven vertically with other layers, although an individual laminate layer may be composed of woven fibers. Such laminate arrangements allow for better use of the material in the flat laminate direction, and do not create bending and interlaminar stresses due to interweaving of plies. A laminate can have any number of layers including realistically 4, 10, 50, 100, or even 500 layers. Thus, a laminate can have a maximum thickness of at least 0.05, 0.25, 0.5, 1.0, or even 5.0 inches.

As used herein, a "pultrusion based laminate" is a laminate arrangement with pultrusions used as some or all of the layers in a laminate. Shear loads in preferred pultrusion based laminates are taken out by interlaid biased pre-preg. It is contemplated that a plurality of pultrusion layers can be applied between a layer or layers of biased material. In areas where the laminate tapers, the ends of the pultrusions are sanded or otherwise abraded, thereby forming a slope to reduce the stress risers that would otherwise occur at the abrupt end of a pultrusion. In some laminates with interwoven biased layers there can be multiple pultruded strips with several tapers throughout the laminate. In other structures, the pultrusion can be up to ten times the thickness of complementary biased layers used to take shear loads. The pultrusion can then be sanded at a 10:1 slope or shallower slope such as 15:1, 25:1, or 50:1 to slowly apply the stress transfer from the tapering pultrusion to the surrounding material. The actual taper ratios will depend on the fiber and resin systems being used. Tapering can be done in both the lateral and longitudinal directions of a beam. As a beam tapers down its length, pultrusions in a cap such as an upper compression cap can be tapered as the bending moment decreases. Similarly, pultrusions can be tapered across the span. In this manner pultrusions that are most effective in the center of the cap can be tapered off as they near the edges where primarily non-pultruded web material becomes more efficient.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

In structures where the tapered beam is not straight, such as a kinked or angled blade, the tapering pultruded strips can be interlaid with strips in the other kink direction. Again biased material would be used to distribute shear stresses between the pultruded layers.

Figure 6:
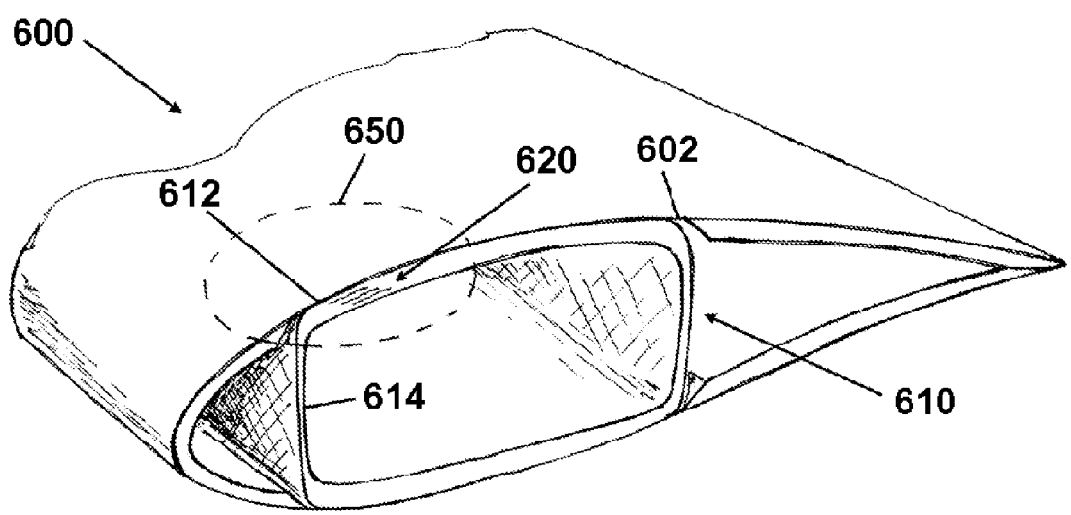
FIG. 6 is an illustration of a preferred wing section structure including a structural box.
Figure 7:
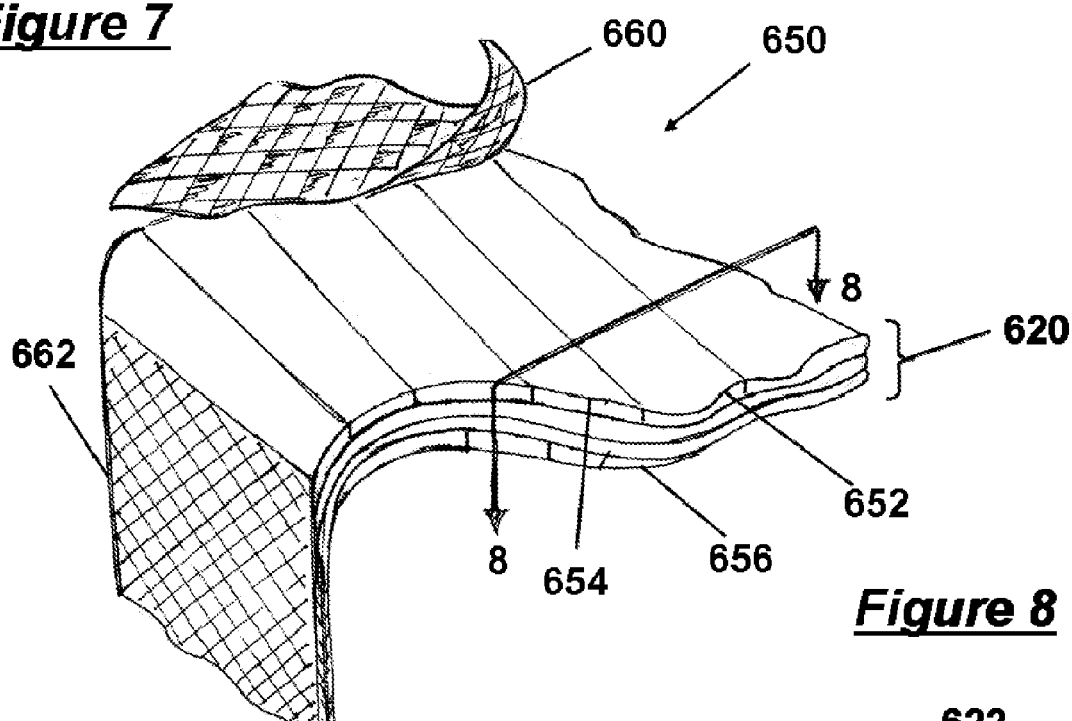
FIG. 7 is an illustration of the upper section structure of the wing box.

FIG. 6 is an illustration of a preferred wing section structure 600 from an airplane 400. This exemplary wing section structure 600 comprises one primary structural box 610, advantageously constructed with a pultrusion based laminate 620. The laminate 620 comprises a plurality of pultruded strips 622, 624 and biased pre-preg tape 626. In this embodiment the pultrusions are used in the upper section 612 surrounded by circle 650 of the structural beam comprising the wing structural spar, while biased pre-preg tape dominates the laminate on the side web 614 where shear forces dominate and compression material such as pultrusions is less structurally efficient. A detail of the upper section structure 650 is shown in FIG. 7.

The upper section structure 650 is a laminated object having layers comprising strips of pultruded material 652, 654, 656. A strip of pultruded material 656 running in the lengthwise direction is shown tapering over its length. In this embodiment, the outside surface is kept smooth with continuous untapered pultrusions 652, 654 running along the outside while tapering occurs by chamfering an interior or inside pultruded layer 656. An outer ply of biased material or other weave 662 covers the outer mold line surface keeping the pultrusions 652, 654, 656 in place and preventing failure of the total structure due to cracking along the pultrusions.

Figure 8:
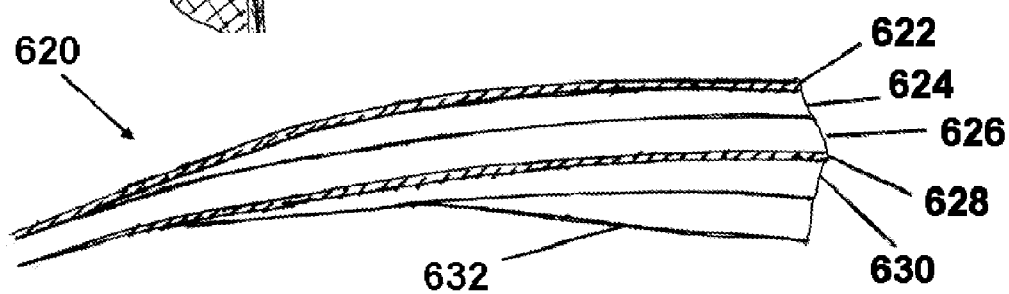
FIG. 8 is a section cut of a laminate in the wing box upper section structure.

FIG. 8 is a section cut of a laminate 620 in the upper section structure 650 showing multiple pultruded strips 624, 626, 630, 632 layered with biased material 622, 628. A strip of pultruded material 632 is shown tapering the lateral or cross ply direction.

A laminate (e.g. laminate 620) has a maximum thickness, often corresponding with a maximum number of laminate layers as might be found in a wing root or blade kinked joint. In tapered structures such as an aircraft wing 410, it is contemplated that a laminate could be tapered at least 40%, 60%, or 80% from a maximum laminate thickness. Methods contemplated for tapering the laminate include dropping off layers, tapering layers, and varying layer thickness. Independently of any tapering, it is contemplated that a layer (e.g. layer 632) in the laminate could vary in thickness by at least 10%, 20%, or 30% along its length. It is further contemplated that the first layer could have a maximum compressive stress before failure at any point along the laminate is at least 70% of a maximum tensile stress before failure of the first layer, and the first layer varies in thickness by at least 10% along its length.

Figure 9:
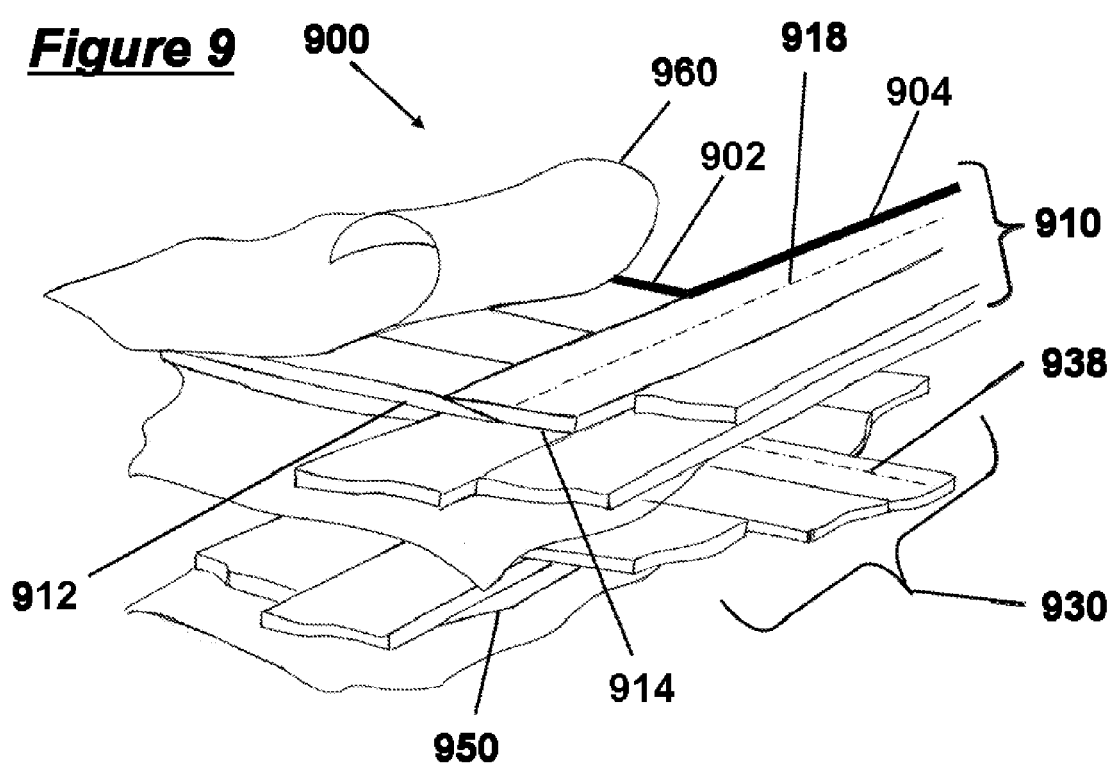
FIG. 9 illustrates a preferred kinked joint in a laminated object.

FIG. 9 illustrates a preferred kinked joint 900 in a laminated object, which should be interpreted to include a rotor blade and a propeller. The kink between two merging outer mold line edges 902, 904 comprises a first pultruded strip 912 coming from a first direction and a second pultruded strip 914 coming from a second direction. The first pultruded strip 912 is in a first layer 910 of the joint 900. It is contemplated that pultrusions might alternate continuity between the left and right sides, as shown the right side pultrusions carry through on the upper layer, and the left side carries through a lower layer 930. The first layer 910 has a long axis 918, while the lower layer 930 has a long axis 938 in a different direction. In preferred embodiments, the angle between layer axes 918, 938 in a kinked joint 900 is at least 10°, 30°, 60°, 90°, or 120°. The ratio of left and right continuity could be advantageously varied depending on the relative loading of the joint. As in the uninterrupted laminate described above, the pultrusions are interlaid between biased plies of unidirectional tape which transfers shear loads between the pultruded layers 940. In the region of the joint, the overall laminate thickness might increase from the additional layers. However, some pultrusions 950 can be tapered as stresses dissipate. An outer layer of biased or woven material 960 is also shown.

Tapering of a laminate, layer, pultrusion, or laminate layer termination edge can be accomplished in any suitable manner, including for example mechanical, chemical, or any other type of processing. Within mechanical processing are included machining, grinding, mechanically abrading, and use of a water jet. Within the chemical category, chemical abrading is included, and within the category of "other" is included use of a laser.

Thus, specific embodiments and applications of using pre-cured composite material in a tapering, highly stressed structure have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of forming a tapered, highly stressed structure, comprising:
   providing strips of pre-cured pultruded composite material, the strips comprising one or more fibers, and the strips having a width dimension and a thickness dimension, and such that the width dimension is at least six times the thickness dimension;
   constructing a laminate including at least one strip and ant least one layer of biased pre-preg tape, the laminate having a maximum laminate thickness; and
   tapering a thickness of a termination edge of the laminate such that at least one fiber in a strip is tapered.

2. The method of claim 1, further comprising providing strips of pre-cured pultruded composite material such that the strip has a thickness of at least $10/1000$ inch.

3. The method of claim 1, further comprising providing strips of pre-cured pultruded composite material such that the strip has a thickness of at least $20/1000$ inch.

4. The method of claim 1, wherein the pre-cured pultruded composite material comprises fibers selected from the list consisting of graphite, carbon, aramid, and boron.

5. The method of claim 1, further comprising the step of including the laminate as a structural component of an aircraft.

6. The method of claim 5, further comprising the step of including the laminate as a structural component of at least one of a wing, a rotor blade, and a propeller.

7. The method of claim 5, further comprising the step of including the laminate as a structural component of a skin.

8. The method of claim 1, wherein the step of constructing the laminate yields a maximum laminate thickness of at least 0.25".

9. The method of claim 1, wherein the step of constructing the laminate comprises using at least four additional strips of pre-cured pultruded composite material.

10. The method of claim 1, wherein the laminate has a first strip with first fibers in a first direction, and the step of constructing the laminate further comprises including a second pultruded, pre-cured strip having second fibers in a second direction.

11. The method of claim 1, wherein the laminate has a first strip with a first long axis and the step of constructing the laminate comprises including a second strip with a second long axis, and the first and second strips have long axes in different directions.

12. The method of claim 11, wherein the different directions vary by at least 10°.

13. The method of claim 1, wherein the step of tapering comprises mechanically abrading.

14. The method of claim 1, wherein the step of tapering comprises other than mechanical or chemical abrading.

* * * * *